United States Patent [19]
Baret et al.

[11] Patent Number: 5,540,482
[45] Date of Patent: Jul. 30, 1996

[54] SEAT AND ITS APPLICATION, ESPECIALLY TO MOTOR VEHICLES

[75] Inventors: Frederick Baret, Montargis; François Fourrey, Montbeliard, both of France

[73] Assignee: Cesa-compagnie Europeene de Siges pour Automobiles, Levallois-Perret Cedex, France

[21] Appl. No.: 240,597

[22] Filed: May 10, 1994

[30] Foreign Application Priority Data

May 10, 1993 [FR] France ..................... 93 05592

[51] Int. Cl.$^6$ ..................... A47C 1/023
[52] U.S. Cl. ..................... 297/344.22; 297/469
[58] Field of Search ..................... 297/344.21, 344.22, 297/344.23, 344.24, 469, 468

[56] References Cited

U.S. PATENT DOCUMENTS

| | | | |
|---|---|---|---|
| 2,576,004 | 11/1951 | Fair | 297/337 |
| 2,992,852 | 7/1961 | Loofbourrow | 297/344.24 |
| 3,973,799 | 8/1976 | Berg | 297/344.24 |
| 4,120,531 | 10/1978 | Fefferman . | |
| 4,238,135 | 12/1980 | Sandham . | |
| 4,722,573 | 2/1988 | Komohara . | |
| 4,796,916 | 1/1989 | Rogers et al. . | |
| 5,000,505 | 3/1991 | Kawashita et al. | 297/240 |

FOREIGN PATENT DOCUMENTS

| | | |
|---|---|---|
| 2531530 | 1/1977 | Germany . |
| WO9218348 | 10/1992 | WIPO . |

Primary Examiner—Peter M. Cuomo
Assistant Examiner—Anthony D. Barfield
Attorney, Agent, or Firm—Sughrue, Mion, Zinn, Macpeak & Seas

[57] ABSTRACT

The seat for a vehicle which is preferably intended to be used with a seat belt capable of assuming an active position in which it is able to keep an occupant in his seat with the aid of a strap (S) held by at least one anchoring point (A), and which comprises a seat part (10) with a cushion (11) carried by a framework (12) mounted on a subframe (14), a backrest (20) with a cushion (21) carried by a framework (22), characterized in that the framework (12) of the seat part (10) cushion (11) is mounted on the subframe (14) by interposition of a turntable (13) so that the seat part (10) cushion (11) can rotate about an axis (130) between a normal position and a turned access position and in that an anchoring point (A) of the strap (S) of the seat belt is placed, directly or indirectly, on the framework (12) of the seat part (10) cushion (11).

Application to land-based motor vehicles.

12 Claims, 4 Drawing Sheets

5,540,482

SEAT AND ITS APPLICATION, ESPECIALLY TO MOTOR VEHICLES

The present invention relates to an improved seat and more particularly, a seat which rotates in part and, if need be, can be folded up and possibly retracted, especially for motor vehicles and very specially for land-based motor vehicles.

The object of the invention is the obtaining of a seat, in particular for a motor vehicle, which is comfortable, which allows easy use and, if need be, which permits easy accessibility to that which is behind the seat and, also, furthermore allows it to be brought into use with improved safety.

Seats are known for land-based motor vehicles and, in particular, bucket seats are known for those vehicles with sporting tendencies, the shell or structure of which is, in general, equipped with just two side-access doors, each one placed on one of the two opposite sides of the vehicle. These seats are usually equipped with a seat part cushion and with a backrest cushion which exhibit lateral padded rolls delimiting hollow shapes, conducive to holding the occupants effectively when they are subjected to transverse lateral forces such as those produced especially when taking corners of relatively short radius at high speed. These seats are furthermore often equipped so as, depending on the case, either to allow the backrest to be folded down against the seat part or to allow the whole of the seat—backrest and seat part together, to be tipped forwards, or one or other of these two movements additionally associated with a forward movement towards the dashboard of the whole of the seat or of its seat part in order to make access to the rear of the vehicle, especially to the rear seats, easier.

This type of seat with lateral padded rolls and fold-down backrest, although offering advantages, is not, in spite of this, without drawbacks. Indeed, it will be noted that the presence of the lateral padded rolls, especially of the cushion of the seat part, constitutes a considerable hindrance which creates difficulties for getting into or out of the seat.

Seats are also known, particularly for a vehicle front seat, which are mounted so as to rotate about a practically vertical axis and which have locking means for immobilizing the seat in the normal "road-going" position, that is to say the one for which the occupant who is seated therein points facing the windscreen of the vehicle. These seats have been developed either in order to facilitate access to or getting out of the vehicle, or to modify the internal space of the vehicle and convert it, for example, into a "lounger". An example of this type of solution is illustrated by document EP 0,358,285.

This type of seat is usually used with a seat belt in order to satisfy the regulations drawn up by the Authorities or professional organizations. Such a seat belt comprises a strap which is most often held by three anchoring points which are fixed to the structure or shell of the vehicle as required by interposition of a winder and which is put on with the aid of a buckle, the locking bolt of which locks into a keeper. It will be observed that seats of this type do not allow easy implementation of a seat belt of the type known as "passive", that is to say of a seat belt which is put on against the body of the occupant of the seat, and taken off automatically and under the dependency of the closure of a door and/or of the occupation of the seat.

This type of seat exhibits two types of drawback. One of these drawbacks is due to the fact that the rotation of the whole of the seat requires a significant free "clearance space" for its movement, which is not compatible with small compact vehicles. The other of these drawbacks is duo to the fact that the seat belt remains fixed in terms of position relative to the shell or structure and does not effectively protect a passenger of extreme size, big or small, and may even present a danger.

The object of the invention is to overcome most of these drawbacks with the aid of an improved seat which, in addition, offers the possibility of automatically putting a seat belt on against the body of its occupant after he has got into this seat.

The subject of the invention is a seat for a vehicle which is preferably intended to be used with a seat belt capable of assuming an active position in which it is able to keep an occupant in his seat with the aid of a strap held by at least one anchoring point, and comprising a seat part with a cushion carried by a framework mounted on a subframe, a backrest with a cushion carried by a framework and, possibly, an articulation connecting the subframe of the seat part to the framework of the backrest in order to allow the cushion of the backrest to be pivoted about an axis relative to the cushion of the seat part. This seat is noteworthy in that the framework of the seat part cushion is mounted on the subframe by interposition of a turntable so that the seat part cushion can rotate about an axis between a normal position and a turned access position, in that an anchoring point for the strap of the seat belt is placed, directly or indirectly, on the framework of the seat part cushion.

The subject of the invention is also the application of such a seat to a land-based motor vehicle.

Other characteristics of the invention will emerge from reading the description and the claims which follow, as well as from examining the appended drawing, given solely by way of example, in which:

Figure 5:
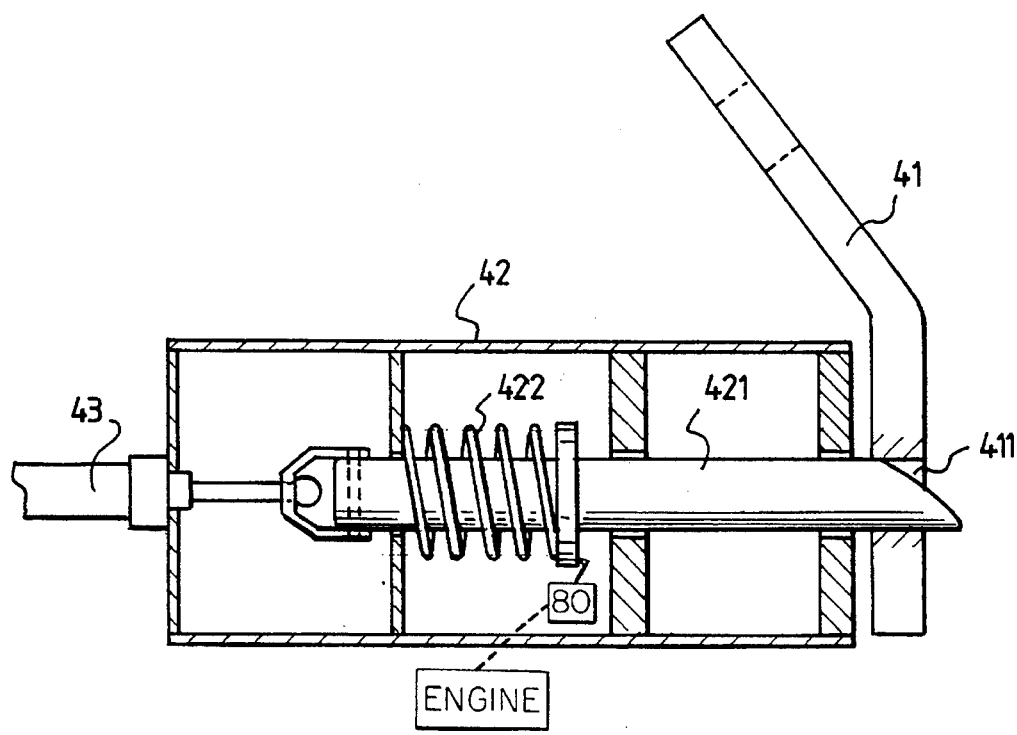
Figure 6:
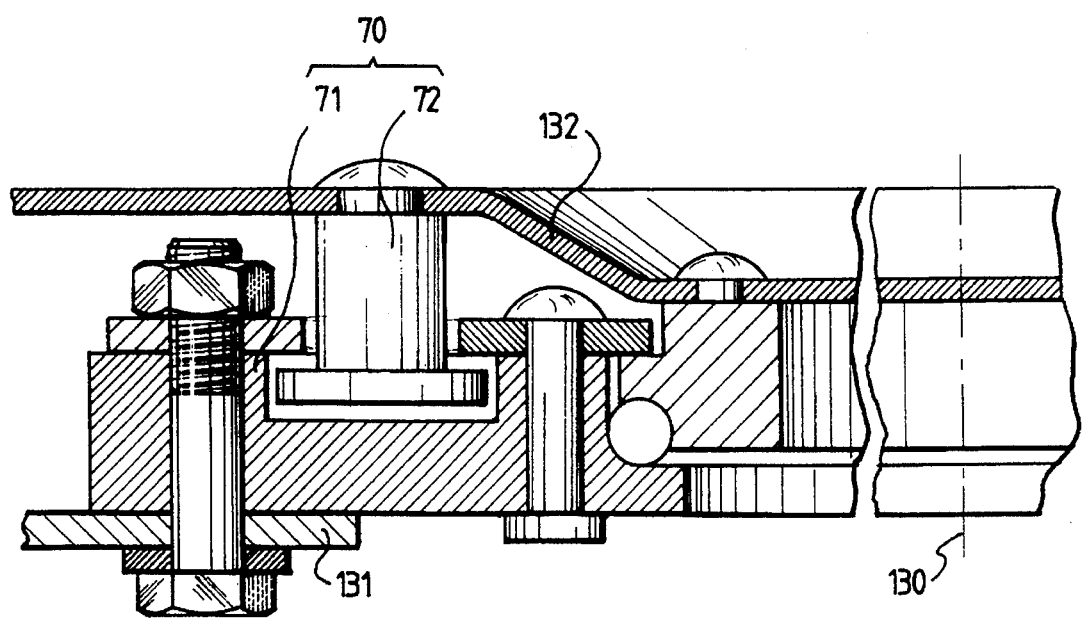

FIG. 5 a detail of an component, partially in section; and,

FIG. 6 is a partial view in axial mid-section, of another component.

Since seats in general, and more especially seats for motor vehicles, especially land-based motor vehicles in particular, are well known in the art, that which follows will describe only that which relates directly or indirectly to the invention. For the remainder, the expert in the technical field in question will delve into the common conventional solutions at his disposal in order to face up to the particular problems with which he is confronted.

In that which follows, the same reference numeral will always be used to identify a homologous element, regardless of the embodiment or its implementational variant.

For the convenience of the explanation, each of the components of an improved seat according to the invention will be described before the manufacture thereof, if need be, and the assembly and operation thereof are explained.

In that which follows, a seat according to the invention will be described for its specific application to a land-based motor vehicle. All the indications relating to the orientation of the seat, such as vertical, horizontal, lateral, transverse, longitudinal, for example, are made with respect to the conventional axes of orientation of a vehicle, in the knowledge that "normal" is qualified as being the position for which the seat occupies a configuration in which, when it is occupied, the person sitting in it is facing the road in the direction of the windscreen. It is, however, obvious that such an application is not the only one possible.

For convenience of the explanation, it will be assumed hereafter that the improved seat according to the invention is the offside front seat of a vehicle. It is obvious that this specific application is not the only one and that an improved seat according to the invention is also suitable for a nearside front seat or even, likewise, for the rear seats of a land-based motor vehicle, especially one known as a touring car or the like.

For its specific application which is described hereafter, it is assumed that an improved seat according to the invention is placed in a shell $C_o$ or structure of a vehicle, one of the openings of which can be closed off by a door $P_o$ connected to the shell or structure by at least one hinge or the like $C_h$, and which is provided with a floor or flooring, not referenced, intended to receive the seat which is anchored thereto. For the convenience of representation, such a part of a land-based motor vehicle is drawn very diagrammatically, illustrated as if it were transparent. Such a vehicle is of any known conventional type.

Preferably and, for the well-known reasons recalled earlier, such a seat is used with a seat belt intended to protect the occupant of the seat in the event of a shock or impact with a large longitudinal component. Such a seat belt usually comprises a strap S held by at least one anchoring point A, and preferably three, so as to have a diagonal strap and a lap strap, one of the anchoring points being situated approximately level with the hip of the occupant of the seat and the other two anchoring points being situated, on the other, opposite, side of the seat, one approximately at the height of the hip of the occupant and the other approximately at the height of his shoulder as is conventional and clearly illustrated in FIG. 1. If need be, this seat belt is equipped with a winder, not drawn, and with a buckle B with a locking bolt P associated with the strap S and with a keeper G connected, directly or indirectly, to the shell or structure via a stalk $P_1$.

All this is conventional and will not be elaborated upon further.

An improved seat according to the invention essentially comprises a seat part 10, a backrest 20, if need be an articulation 30, and locking means 40. If required, the seat according to the invention also comprises a return means 50, an automatic-control device 60, a mechanism 70 for taking up load, and a safety feature 80 in order to prevent the engine from being started up under certain circumstances.

The seat part 10 comprises a cushion 11 carried by a framework 12 which is mounted by the interposition of a turntable 13 which can move in terms of rotation about an axis 130, preferably approximately vertical, relative to a subframe 14 intended to rest on the floor or flooring. In that way, the cushion 11 of the seat part 10 can turn between a normal road-going position and a turned access position. The turntable 13, of any common conventional type, is for example one with a pivot, either with a ring of balls and the raceways for the latter, or smooth with a rod and bearings. The turntable 13 comprises a semi-fixed element 131 secured to the subframe 14 and a moving element 132 secured to the framework 12 of the cushion 11. In that way, the moving element 132 can turn about the axis 130 with respect to the semi-fixed element 131. The subframe 14, which in some way acts as an underframe, is associated with the floor or flooring, for example by a connection of any known conventional type such as hinge pins which, if need be, allows the whole of the seat to be tipped forwards about an axis, for example orthogonal to the axis 130. In this case, the subframe is then kept against the flooring with the aid of a lock or the like. One exem-plary embodiment is explained, for example, in document FR 2,562,126. The subframe 14 is, for example, made up of a slideway 141 of any conventional type which comprises a slide 1411 to which is fixed the semi-fixed element 131 of the turntable 13 made, for example, of a suitably stamped and welded metal sheet, and an appropriate base 1412 which is connected to the floor or flooring if required by the interposition of the connection indicated before. These various components are represented very diagrammatically in the figures and it will be observed that a seat is usually equipped with two slideways. The slideway, as is known, allows the position of the seat to be adjusted longitudinally with respect to the floor or to the flooring in order to adapt this position to the morphology of its occupant, to the comfort which he is seeking and, if required, to his style of driving if this concerns the driver's seat. The slideway is immobilized in the chosen position with the aid of a catch or the like. If required, this slideway is of the type known as "memory type" which allows the seat to be placed back automatically into the longitudinal position in which it had been placed beforehand if the latter has been pushed forwards in order to facilitate access to the seats or volume behind it. One embodiment of a slideway with memory is described, for example, in document FR 2,631,592.

Appropriate limit stops of any suitable conventional type, judiciously located, serve to keep the seat part cushion, for example, in its turned access position and the slideway(s) in its (their) fully forward position.

The presence of the turntable 13 interposed between the framework 12 of the seat part 10 cushion 11 and the subframe 14 makes it possible to pivot the cushion, for example through approximately 90°, between the normal position known as "road-going" position and the turned position, known as "access position", after rotation of the order of a quarter of a turn in one direction or the other, depending on whether this concerns the nearside seat or the offside seat.

The backrest 20 essentially comprises a cushion 21 carried by a framework 22.

Preferably, the articulation 30 connects the subframe 14 of the seat part 10 to the framework 22 of the backrest 20. This articulation, which comprises flanges 31 connected, in the case of some of them, to the framework of the seat part and, in the case of others, to the framework of the backrest, makes it possible to pivot the cushion of the backrest about an axis 300, for example preferably practically orthogonal to the axis 130 of rotation of the seat part cushion. The cushion of the backrest may therefore assume a position which can be modified relative to the seat part cushion. This articulation 30, of any known appropriate conventional type, permits, if need be, a modification of the relative inclination of the cushion of the backrest with respect to the cushion of the seat part, which is continuous or discontinuous and which takes place about an axis coincident with the axis 300 or distinct from the latter if, apart from this change in inclination, the backrest cushion is also capable of being folded down completely in order to be applied against the seat part cushion. A catch, not represented, makes it possible to hold, as is known, the backrest cushion in an upright position in which an occupant can rest his back against it whilst permitting, if need be, adjustment of the inclination. The maneuvering of the catch is provided by a suitable control, of any known type, for example with a cable and sheath of the Bowden type, or with a linkage, connected to a knob situated on the outer side of the backrest practically halfway up the latter, as is conventional.

The frameworks, cushions and articulation are of any conventional common type usually used especially on board motor vehicles. This is why these will not be expanded upon more fully.

The locking means 40 serve to immobilize the seat part 10 cushion 11 especially in its normal position and for holding the seat belt in its active position. As can be seen, the locking means 40 form an anchoring point A of the strap of the seat belt, which point is placed directly or otherwise on the framework 12 of the seat part 10 cushion 11 and which connects it to the subframe 14 directly or indirectly, as will be understood by that which follows. These anchoring means 40 comprise an anchoring support 41 associated, for example, with the semi-fixed element 131 of the turntable so as to be secured in terms of rotation to the framework 12 of the seat part 10 cushion 11. The anchoring support 41 acts as a keeper 411 made up, for example, of a circular opening. It is to this anchoring support 41 that there is fixed, for example, in particular, the keeper G of a buckle B of the seat belt, by interposition of the stalk $P_1$ as is conventional. The locking means 40 also comprise a box 42 equipped with a locking bolt 421 which is in the form of a rod or the like, one of the ends of which terminates in a chamfer intended to interact with the keeper 411 and the other of the ends of which terminates in an eye or the like. A spring 422 elastically urges the locking bolt 421 into a position in which it normally locks onto the keeper 411 in order to disable the locking means 40 in order to immobilize the seat part 10 cushion 11 in its normal position. The locking means also comprise a control 43 connected to the locking bolt, for example by interposition of its eye. This control, of any appropriate type, is manual for example, and made up of a linkage or of a cable terminating in an operating knob. This control may also be automatic, for example electro-mechanical or fluid-operated of any appropriate type, as will be understood by that which follows.

The return device 50 tends to place the seat part 10 cushion 11 in at least one of its two positions—the normal position and the turned access position. This return device 50, of any appropriate type, either monostable, or bistable, with transition through a position of equilibrium, may operate, for example, by gravity as described in document U.S. Pat. No. 3,207,464, or operate mechanically, electromagnetically, fluidly. In the embodiment illustrated, the return device 50 is mechanical and comprises a sandow or spring 51, one of the ends of which is secured to the semi-fixed element 131, and the other of the ends of which is secured to the moving element 132 of the turntable, as well as a pulley 52 or the like rotationally keyed onto the moving element 132 and against which the sandow or spring 51 bears.

Preferably, an automatic-control device 60 of any appropriate type, mechanical, electrical, hydraulic or the like, is associated with the locking means 40 in order to ensure operation thereof and, in particular, enabling when a door, preferably corresponding to the seat, for example, is maneuvered.

The mechanism 70 for taking up load is located between, on the one hand, for example the framework 12 of the seat part 10 cushion 11 or the moving element 132 and, on the other hand, for example the floor or flooring or the subframe 14, for example the slide 1411 or the semi-fixed element 131. As can be seen, particularly from examining FIG. 6, this mechanism 70 for taking up load comprises a female member 71 such as, for example, a slit with lips in the form of an inverted T connected directly or indirectly to the floor or flooring, and a male member 72, for example in the form of a peg with a head, connected directly or indirectly to the framework 12 and capable of engaging in the female member so as not to be able to separate itself therefrom when the occupant of the seat transmits significant stresses to the latter resulting from loads exerted on the strap of the seat belt following a shock or violent jolt.

The safety feature 80, for example a position detector associated with a switch, is located so as to prevent the engine from being started up if the locking means 40 are not suitably disabled in order, both to immobilize the seat part 10 cushion 11 in its normal position and to hold the seat belt in its active position. A position detector makes it possible to know whether the locking bolt 421 is totally and correctly engaged in the keeper 411.

The components of an improved seat according to the invention are manufactured from metal and/or synthetic materials suitably chosen and shaped according to traditional techniques then, are joined together, assembled, and fitted as appears clearly from the figures of the drawing.

The operation of an improved seat according to the invention will now be described.

Figure 1:
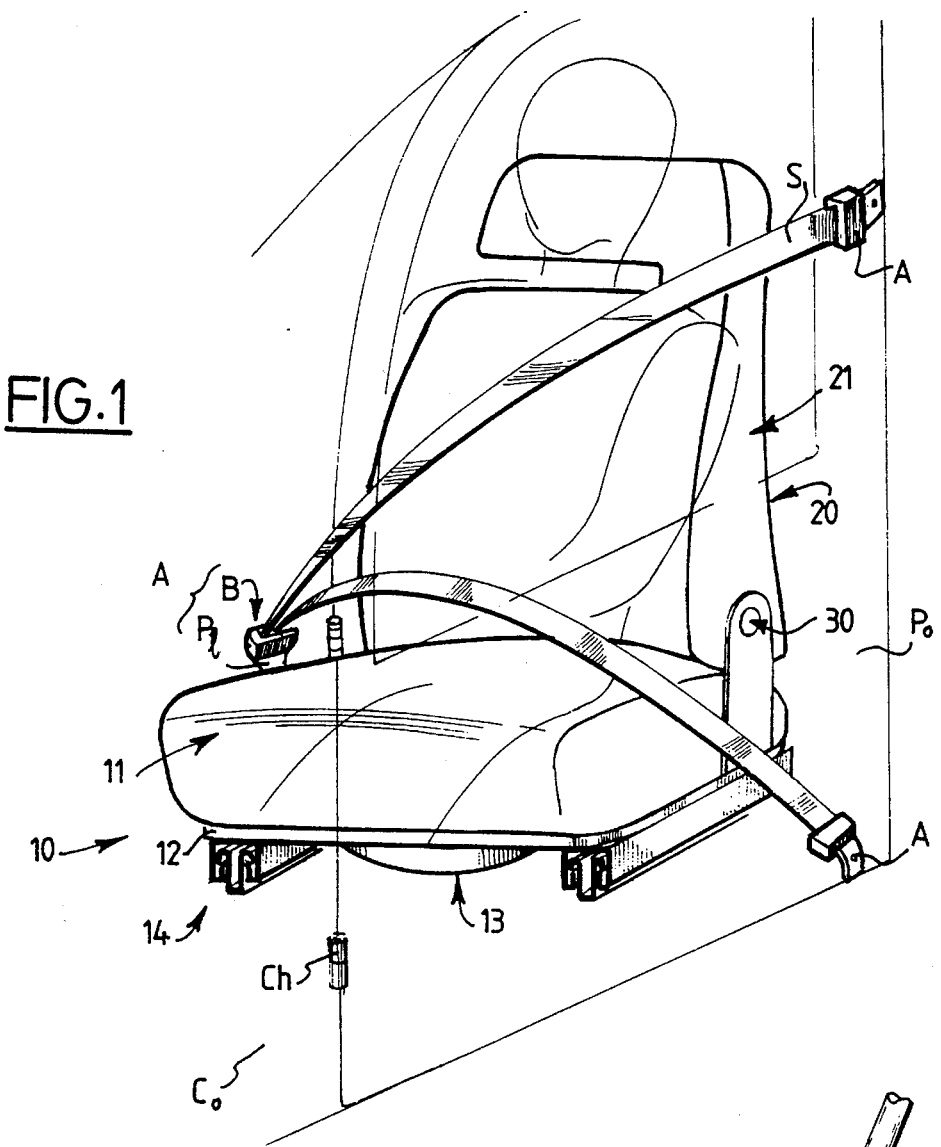
FIG. 1 is a diagrammatic perspective view of one embodiment of an improved seat according to the invention in its application to a land-based motor vehicle, illustrated partially symbolically as if it were transparent.
Figure 2:
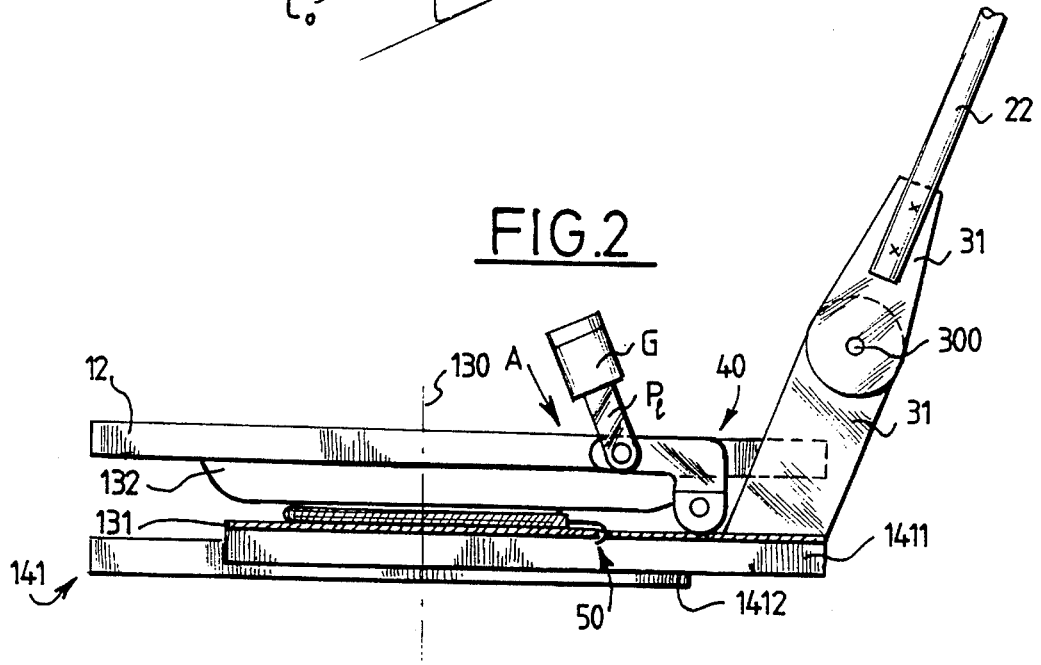
FIG. 2 is a partial lateral view of FIG. 1 with local axial mid-section.
Figure 3:
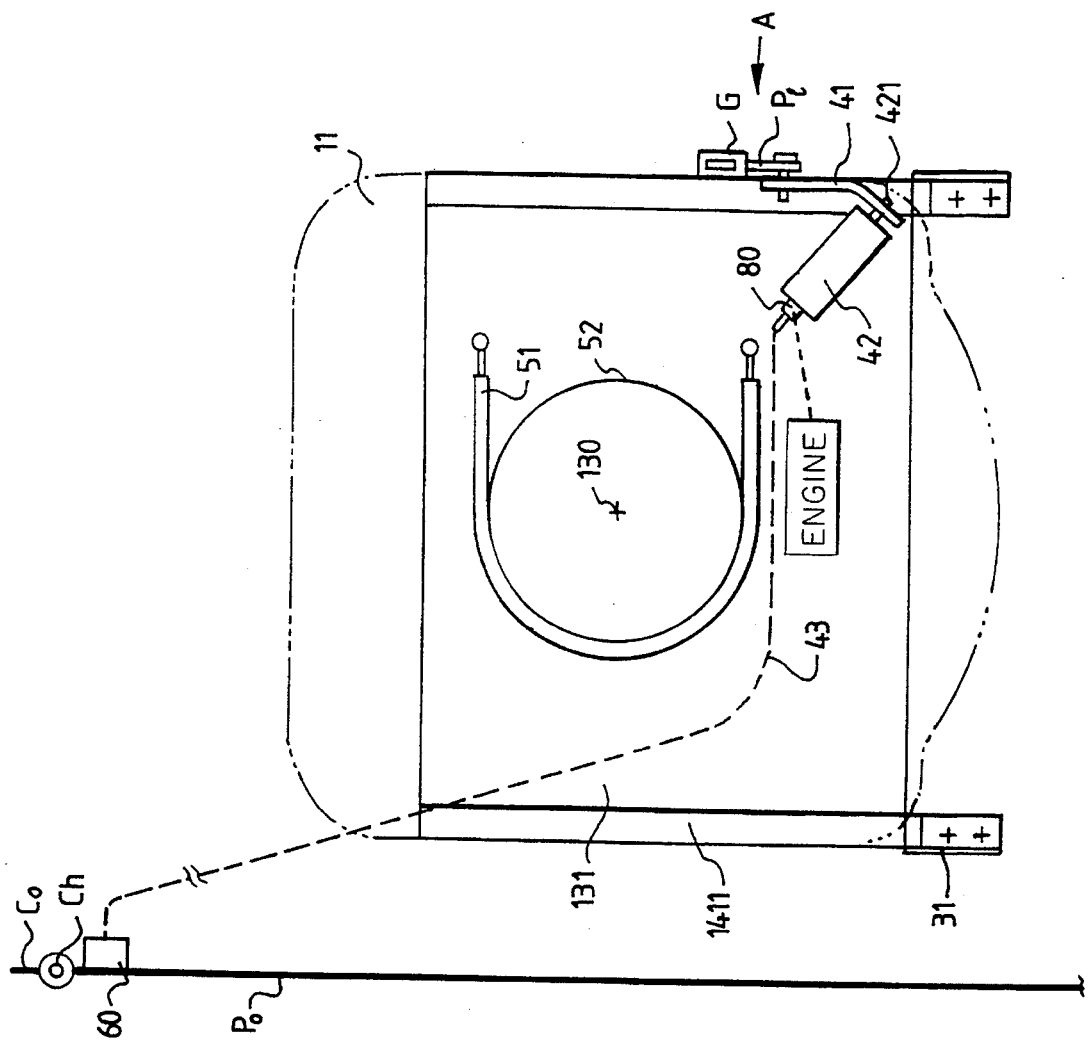
FIG. 3 is a partial plan view of FIG. 1, in which the seat part cushion occupies its normal road-going position, with the door closed.

It is assumed that a seat according to the invention is initially in the situation in which it is illustrated in FIG. 1 and FIGS. 2 and 3 in which it occupies its normal position.

It will be observed that the control connects the locking bolt of the locking means to the door in the vicinity of its lower hinge.

In the case where the seat belt is not of the type known as "passive", it comprises a buckle with a locking bolt P connected to the strap of the seat belt between its diagonal and lap straps and a keeper G connected via its stalk to the anchoring support for the locking means, connected to the seat part framework.

The occupant then sitting on his seat and desiring to get out of the vehicle, unfastens his seat belt and opens the door. The opening of the door causes the looking bolt 421 to recoil and gives rise to the enabling of the locking means. The seat part cushion is then free to rotate and can pivot about the axis 130 in order to leave its normal position and place itself in the turned position facing the door opening, simply by means of the occupant twisting his body. The occupant can then get out of the vehicle easily.

The return device holds the seat part cushion in the turned access position against the corresponding limit stop, not illustrated. When a user wishes to get into the seat, it is sufficient for him to open the corresponding door since he finds the seat part cushion in the turned access position ready to receive him. Once seated, the occupant, by twisting his body, causes the seat part cushion to turn until it assumes its normal road-going position, after having started to close the door, in which road-going position the seat part cushion is automatically immobilized by the disabling of the locking means. The occupant can then put on his seat belt in the usual way, which he fastens by engaging its locking bolt P into its keeper connected by its stalk to the anchoring support for the looking means secured to the seat part framework connected, for example, to the slide of the slideway. It can therefore be seen that the anchoring point of the strap of the seat belt, which anchoring point is placed on the framework of the seat part cushion follows the adjustment of the longitudinal position of the seat in terms of translation and therefore gives an optimum position to the strap of the seat belt regardless of the size of the driver.

The improved seat according to the invention is very suitable to the situation in which it is equipped with a seat belt of the type known as "passive". An example of a seat belt of the type known as "passive" is described, for example, in document FR 2,585,307, to which reference may usefully be made. In such a case, it is sufficient for the anchoring point associated with the framework of the seat part cushion to be of a type in which the "buckle" is such that its locking bolt remains, for example, permanently locked into the keeper connected by the stalk to the support for anchoring the looking means. This anchoring point placed on the framework or directly or indirectly connected to it therefore permanently retains the strap. In such a case, it is sufficient for the other two separate and distant anchoring points which are situated on the opposite side of the seat in order respectively to delimit the lap strap and the diagonal strap of the seat belt to be anchored, no longer fixed to two zones of a corresponding part of the shell or structure, but anchored or mounted so that they can move respectively in two separate zones distant from a corresponding part, preferably for example a door close to the edge opposite the one to which the door is articulated to the shell or structure; all this is particularly well illustrated in FIG. 1, although in a very diagrammatic form.

Figure 4:
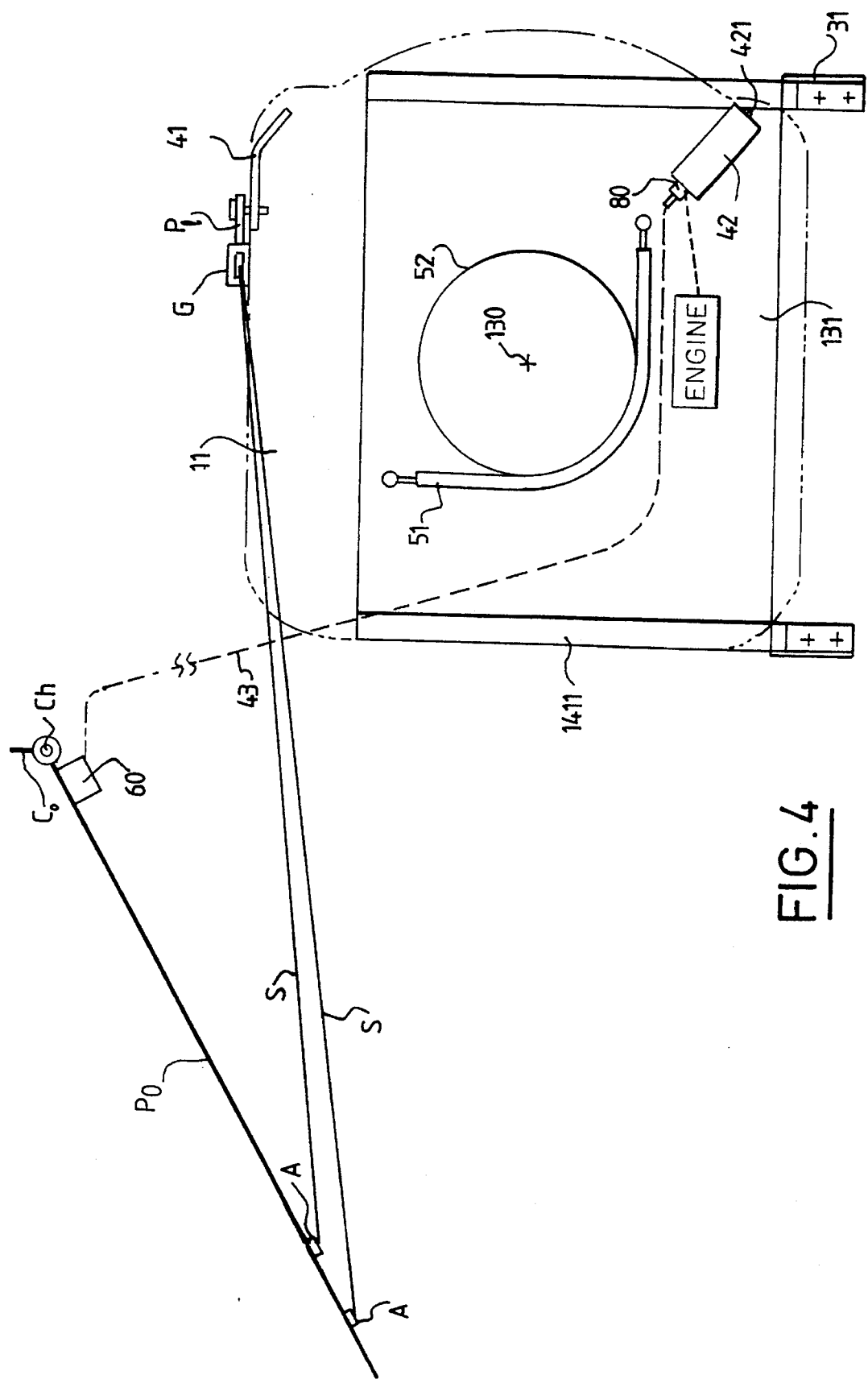
FIG. 4 is a view analogous to that of FIG. 3 but in which the seat part cushion now occupies its turned access position, with the door open.

As will be grasped, particularly from examining FIG. 4, when the door is open and the cushion of the seat part is pivoted and occupies its turned access position, the anchoring point associated with the framework of the cushion points forwards, and the diagonal and lap straps of the seat belt, connected to the door by their specific anchoring points, are entrained in the same direction away from the backrest of the seat: it is therefore possible to get into the seat easily and sit down on it. Once seated, the occupant causes the cushion of the seat part to turn in order to make it assume its normal position, and when he closes the door again the anchoring points anchored to the latter place the lap and diagonal straps of the seat belt back in the position illustrated in FIG. 1 in which the seat belt occupies its active position in which it is able to keep an occupant in his seat. It is therefore understood that the improved seat according to the invention gives rise to the automatic putting on or taking off of the seat belt with maximum comfort and safety.

In the foregoing, it was assumed that the return device was monostable and caused the seat part cushion to turn automatically only to place it back in its normal position. It is also possible to use a bistable return device with transition through a point of equilibrium so that the seat part cushion automatically assumes either its normal position or its turned position. In that way, after having got out of the seat and left the vehicle, it is sufficient to cause the seat part cushion to turn, for example manually, in the appropriate direction, towards its road-going position in which it will be locked again automatically after transition through the point of equilibrium. Conversely, after opening the door, it is possible to act, for example manually, on the seat part cushion in order to cause it to pass this time from its normal position to its turned position.

In the foregoing, an improved seat with manual operation was described. It is clear that this operation could be made even more agreeable by equipping it with an automatic-control device of any suitably-adapted common conventional type, for example electric, pneumatic, hydraulic, etc. In that way, as soon as a door has been unlocked and/or opened, the seat part cushion automatically pivots in order to assume its turned position if it did not occupy this one beforehand, entraining with it that anchoring point of the seat belt which is associated with it. After having sat in the seat, beginning to close the door then triggers the automatic return of the seat part cushion to the normal or road-going position, and its disabling in this position after complete closure of the door which ensures that the seat belt is put on automatically as indicated before.

As may have been observed, for the case in which it is used with a seat belt of the type known as "passive", the improved seat according to the invention has been described with regard to a vehicle equipped with a door articulated on hinges with approximately vertical axes. It is obvious that the seat according to the invention is equally suitable for the case of doors known as sliding doors which move forwards to open or in the case of those of the type known as "wing doors" which pivot forwards in an approximately vertical plane in order to open.

The foregoing clearly demonstrates the particular features of the invention, the benefit which it offers and the advantages which it procures.

We claim:

1. A seat for a vehicle comprising:
   a seat part (10) with a cushion (11) carried by a first framework (12) mounted on a subframe (14); and
   a backrest (20) with a cushion (21) carried by a second framework (22), and adapted to receive an articulation (30) connecting said subframe (14) of the seat part (10) only to said second framework (22) of the backrest (20) to be pivoted about an axis (300) from an upright position to a folded position relative to said cushion (11) of the seat part (10);
   wherein said framework (12) of the seat part (10) cushion (11) is mounted on said subframe (14) by interposition of a turntable (13) so that the cushion (11) of said seat part (10) is rotatable independently of said backrest about an axis (13) between a normal position and a turned position providing access to the seat without changing the position of said backrest (20) in its upright position;
   wherein an anchoring bracket (A) for a seat belt (S) is directly connected to said framework (12) of the cushion (11) of the seat part (10);
   wherein said seat comprises locking means (42), mounted on said subframe and selectively engageable with said anchoring bracket, for immobilizing said cushion (11) of said seat part (10) in its normal position; and
   wherein said locking means connects said anchoring bracket to said subframe (14).

2. The seat according to claim 1, further comprising a mechanism (70) for taking up a load which is placed under said seat part (10) and which is interposed between, on the one hand, an element selected from a group consisting of said framework (12) of the seat part cushion (11) and a moving element (132) of said turntable (13) and, on the other hand, an element selected from a group consisting of said subframe (14) and a floor on which the seat rests.

3. The seat according to claim 1, wherein the locking means comprises means (422) for disabling said locking means to automatically immobilize said seat part (10) cushion (11) in its normal position when said seat part (10) cushion (11) assumes its normal position.

4. The seat according to claim 1, further comprising a return device (50) tending to place said seat part (10) cushion (11) in at least one of its two positions: the normal position and the turned position.

5. The seat according to claim 1, wherein the locking means comprises an automatic-control device (60) in order to ensure operation of said locking means when a part corresponding to the seat is maneuvered.

6. The seat according to claim 1, wherein said seat comprises a safety feature (80) cooperating with said locking means and comprising a locking bolt (421) for preventing an engine of the vehicle from being started up if the locking means is not disabled.

7. An arrangement of a seat for a vehicle in combination with a seat belt which is movable to an active position in which the seat belt is adjusted to keep an occupant in the seat with the aid of a strap (S) held by at least one anchoring bracket (A), said seat comprising:

- a seat part (10) with a cushion (11) carried by a first framework (12) mounted on a subframe (14); and
- a backrest (20) with a cushion (21) carried by a second framework (22), and adapted to receive an articulation (30) connecting said subframe (14) of the seat part (10) only to said second framework (22) of the backrest (20) to be pivoted about an axis (300) from an upright position to a folded position relative to said cushion (11) of the seat part (10);
- wherein said framework (12) of the seat part (10) cushion (11) is mounted on said subframe (14) by interposition of a turntable (13) so that the cushion (11) of said seat pan (10) is rotatable independent of said backrest about an axis (13) between a normal position and a turned position providing access to the seat without changing the position of said backrest (20) in its upright position;
- wherein said one anchoring bracket (A) of the strap (S) of the seat belt is directly connected to said framework (12) of the cushion (11) of the seat pan (10);
- wherein said seat comprises locking means (42), mounted on said subframe and selectively engageable with said anchoring bracket, for immobilizing said cushion (11) of said seat part (10) in its normal position and for holding said belt in its active position; and
- wherein said locking means connects said anchoring bracket to said subframe (14).

8. The arrangement according to claim 7, wherein the locking means comprises means (422) for disabling said locking means to automatically immobilize said seat part (10) cushion (11) in its normal position and to automatically hold said seat belt in its active position when said seat part (10) cushion (11) assumes its normal position.

9. The arrangement according to claim 7, wherein the seat belt comprises a buckle (B) having a buckle locking bolt (P) and a buckle keeper (G) intended to be engaged one into the other, and wherein said anchoring bracket comprises a support (41) for the buckle keeper (G), and an aperture defined on the support (41), and wherein said locking means (42) comprises a locking bolt (421) intended to be engaged into the aperture, and a manually operated controlling means (43) acting on the locking bolt (421) of the locking means in order to release said seat part (10) cushion (11).

10. The arrangement according to claim 7, wherein the seat belt comprises a buckle (B) having a buckle locking bolt (P) and a buckle keeper (G) intended to be engaged one into the other, and wherein said anchoring bracket comprises a support (41) for the buckle keeper (G), and an aperture defined on the support (41), and wherein said locking means (42) comprises a locking bolt (421) intended to be engaged into the aperture, and an automatically operated controlling means (43) acting on the locking bolt (421) of the locking means in order to release said seat part (10) cushion (11).

11. The arrangement according to claim 7, wherein the strap is held by three anchoring points (A), and wherein a first of said anchoring points (A), defined by said anchoring bracket of the strap (S), is placed on said framework (12) of the seat part (10) cushion (11) and permanently retains the strap (S), and wherein the other two of said three anchoring points (A) are opposite said first anchoring point (A) relative to the seat in order respectively to delimit a lap strap and a diagonal strap of the seat belt, and are mounted so that they are adapted to be movable in two separate zones distant from a corresponding part so as to form a seat belt of the type known as "passive".

12. The arrangement according to claim 7, wherein said corresponding part is adapted to be mounted on a door ($P_o$) of the vehicle.

* * * * *

UNITED STATES PATENT AND TRADEMARK OFFICE
CERTIFICATE OF CORRECTION

PATENT NO. : 5,540,482
DATED : July 30, 1996
INVENTOR(S) : Baret et al

It is certified that error appears in the above-identified patent and that said Letters Patent is hereby corrected as shown below:

On the title page: Item [73] Assignee: should read -- CESA-COMPAGNIE EUROPEENE DE SIEGES POUR AUTOMOBILES LEVALLOIS-PERRET CEDEX, FRANCE--.

Signed and Sealed this

Seventeenth Day of March, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT : 5,540,482

DATED : July 30, 1996

INVENTOR(S): Frederick Baret and François Fourrey.

It is certified that error appears in the above-identified patent and that said Letters Patent is hereby corrected as shown below:

On the title page, in [73], the assignee should be corrected to read:

--CESA-COMPAGNIE EUROPEENNE DE SIEGES POUR AUTOMOBILES, Levallois-Perret Cedex, France--.

Signed and Sealed this

Thirty-first Day of October, 2000

*Attest:*

Q. TODD DICKINSON

*Attesting Officer*     *Director of Patents and Trademarks*